Sept. 29, 1931.    N. H. KNOWLTON    1,824,959
MACHINE FOR USE IN THE MANUFACTURE OF BOOTS AND SHOES
Filed Sept. 15, 1926

INVENTOR
Norwood H. Knowlton

Patented Sept. 29, 1931

1,824,959

UNITED STATES PATENT OFFICE

NORWOOD H. KNOWLTON, OF ROCKPORT, MASSACHUSETTS, ASSIGNOR TO UNITED SHOE MACHINERY CORPORATION, OF PATERSON, NEW JERSEY, A CORPORATION OF NEW JERSEY

MACHINE FOR USE IN THE MANUFACTURE OF BOOTS AND SHOES

Application filed September 15, 1926. Serial No. 135,601.

This invention relates to machines having shafts and bearings therefor, and is herein disclosed as embodied in a machine for trimming the edges of the soles of shoes, but is not limited to machines of the type shown.

In machines that have high-speed shafts for carrying rotary tools, of which an edge-trimming machine is an example, it is essential that such shafts be accurately balanced, accurately fitted to their journal bearings so that there will be neither side-shake nor binding, and sustained against end-shake without pressure that would produce heating. The utmost accuracy is vital to prevent vibration of the cutter shaft of an edge-trimming machine in view of the exacting conditions of the trimming operation and the high speed required of the trimming cutter. It is customary to drive such a shaft at speeds not less than 8000 R. P. M. and often as high as 10,000 R. P. M. Vibration of even the smallest magnitude in an edge-trimming cutter is objectionable in that it produces irregularities on the trimmed edge of the work and militates against smooth manipulation of the work by the operative. In this operation the work is held in the hands and is fed, guided, and otherwise manipulated by skill of eye and hand without assistance from any guiding element except a shield arranged next to the cutter to prevent the latter from touching the upper of the shoe. The problem of eliminating vibration without ruining the bearings is particularly difficult in the case of a shaft that rotates at speeds so great, because the latter require the utmost freedom from binding that would cause heat to be generated by friction in the bearings.

From long experience it has been found that it is not feasible to use split journal bearings for the cutter shaft of an edge-trimming machine because it is practically impossible to set up a split bearing securely and at the same time eliminate all side shake of the shaft relatively to it without causing it to bind the shaft. Consequently, it is the practice to use non-split or one-piece bearings and to insert the journal portions of the shaft through them axially. It is also the practice to arrange the pulley of the cutter shaft between two journal portions of the shaft and to arrange the two journal bearings in two integral supporting portions or sockets of a frame or column. These conditions create an assembling problem that has heretofore been overcome by using a detachable pulley and placing it between the bearings before the shaft is inserted through it and the bearings. Now, while a detachable pulley makes the described assembling possible it requires some mechanical device, for example a key, set-screw or pin, to secure it to the shaft, and such a device must, of necessity, be accessible. But a more serious aspect of this construction is that it is virtually impossible to obtain accurate balance of the rotary assemblage when the shaft and pulley are assembled according to the described procedure.

In view of the conditions explained an object of the invention is to provide an improved construction that will permit a permanently integral shaft and pulley, preferably trued to accurate balance, to be mounted in bearings in a frame unit without dividing or splitting either the frame or the bearings to place the pulley between the latter. The expression "a permanently integral shaft and pulley", as used here, does not necessarily mean a shaft and pulley both made in one piece, but means a construction in which a shaft and pulley are permanently fixed one to the other.

In accordance with the stated purpose, a novel feature of the invention consists in a machine comprising a frame unit formed with cylindrical bearing sockets in coaxial relation, non-split journal bearings formed to be inserted axially into said sockets respectively, and a shaft having a permanently integral driven member, such as a pulley, between two journal portions, one of the bearing sockets being large enough to permit the driven member to pass through it so that the parts may be assembled.

The illustrated edge-trimming machine comprises a forepart cutter formed as usual with inclined portions adapted to bevel the margin of the welt surface and the margin of the tread surface of the sole. If, for the sake of illustration, the cutter has any appreciable end-shake, these inclined portions will attack the welt and the tread surface alternately and thereby produce undulations rather than uniform bevels. On the other hand, if end-shake is eliminated by means that impose any considerable binding effect on the cutter shaft, the latter will be heated, when running at the required speed, to a temperature that will develop what is commonly termed a "hot-box", and will stick in one or both of its journal bearings.

In view of these considerations, a further object of the invention is to provide improved means for eliminating end-shake from a tool-shaft without developing appreciable heat.

To this end a feature of the invention consists in an improved combination comprising, as herein illustrated, a shaft, a bearing sleeve therefor, and a double-acting thrust-bearing the component parts of which are affixed to one end of the sleeve so that the sleeve, the thrust-bearing and the shaft may remain assembled and cooperatively intact while they are being mounted in and demounted from the frame of the machine in which they are to be used. To provide both for assembling the shaft and the sleeve and for the described arrangement of the thrust-bearing, the illustrated shaft is formed with an annular peripheral groove near one end. This groove provides one of the transverse faces with which the thrust-bearing cooperates, the complemental transverse face being the adjacent end face of the shaft.

These and other features of the invention are hereinafter described and claimed and are illustrated by the accompanying drawings.

Referring to the drawings.

Figure 2:
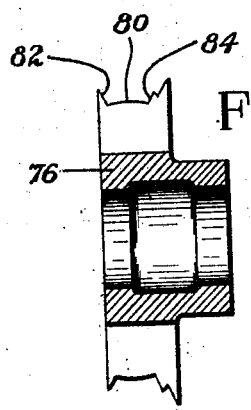
Fig. 2 is a sectional view, on a larger scale, of a well-known type of cutter for trimming the forepart of the sole of a shoe.
Figure 3:
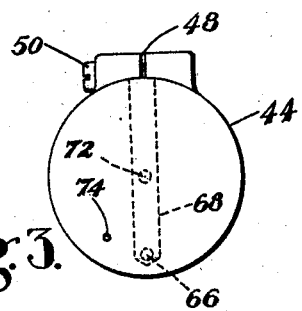
Fig. 3 is an end view of the cap shown at the right of Fig. 1.

The frame 10 of the illustrated machine comprises a hollow unit or column in which the pulleys and belts are enclosed for the safety of bystanders. The shaft 12 is designed to carry a cutter 76 (see Fig. 2) which is hereinafter described. Two journal portions of the shaft are indicated at 14, 14, and a pulley 16 is arranged between them. To provide for high speed of rotation without vibration, the shaft and pulley are preferably embodied in a permanently integral construction and ground or otherwise trued in the process of manufacture to accurate balance. By characterizing the shaft and pulley as "integral" I do not mean that they are necessarily made of one piece of metal, although they could be so made. I obtain the same result by making the shaft and pulley of separate pieces of metal and "shrinking" the pulley on the shaft. The principal consideration involved in this "integral" construction is that the shaft and pulley are permanently fixed relatively to each other so that when once trued to accurate balance the latter will be permanent.

The frame unit 10 is formed with two coaxial sockets 18 and 20 in opposite walls to receive the shaft-bearings hereinafter described. The internal surfaces of these sockets are preferably cylindric for reasons that will be understood after further description, and at least one of these sockets should have a diameter sufficient to permit the largest part of the rotary unit, that is, the pulley 16, to pass therethrough, so that the rotary unit may be assembled with the frame 10 by inserting it axially through the socket in question. As shown, both sockets 18 and 20 are large enough to permit the rotary unit to pass therethrough, since it is preferable, from the manufacturing standpoint, to make them of equal diameters than of unequal diameters.

It is to be noted not only that the sockets 18 and 20 are formed in the same frame unit, but also that each socket is completely formed in said unit. That is, the sockets are not divided into sections as in some former constructions which require taking the sections apart to permit assembling the shaft and bearings in the frame. The present construction insures rigidity of the sockets and permanency of diameter and alinement.

Figures 4, 5:
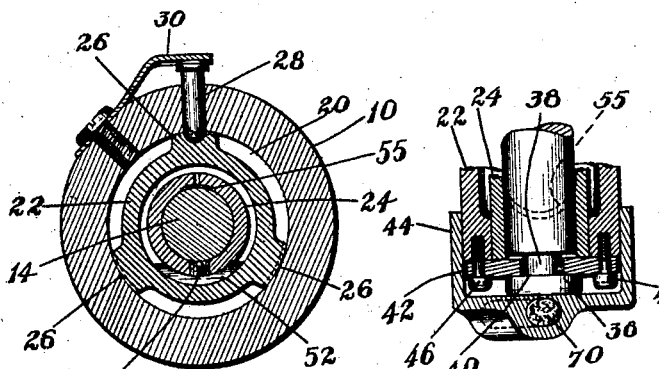
Fig. 4 is a sectional view in the plane indicated by line IV—IV of Fig. 1.
Fig. 5 is a section in the plane indicated by line V—V of Fig. 6.

The journal bearings for the cutter-shaft are of the non-split type, each comprising a one-piece bushing 24 and a one-piece sleeve or holder 22 in which the bushing is tightly fitted. These bearings are adapted to be inserted axially into the sockets 18 and 20 and are preferably adapted to be self-alining. As shown by Fig. 4, each sleeve 22 is provided with three bosses 26. The outer faces of these bosses are spheroidal and of the same radius as the internal cylindric surfaces of the sockets 18 and 20. One boss 26 of each sleeve 22 is formed with a hemispherical socket to receive the hemispherical end of a locking pin 28 by which the sleeve is maintained against endwise displacement. The pin is arranged to slide radially in the socket portion and is pressed inwardly by a stiff leaf spring 30 with sufficient force to eliminate all side-shake, if any, of the bearings.

Figure 1:
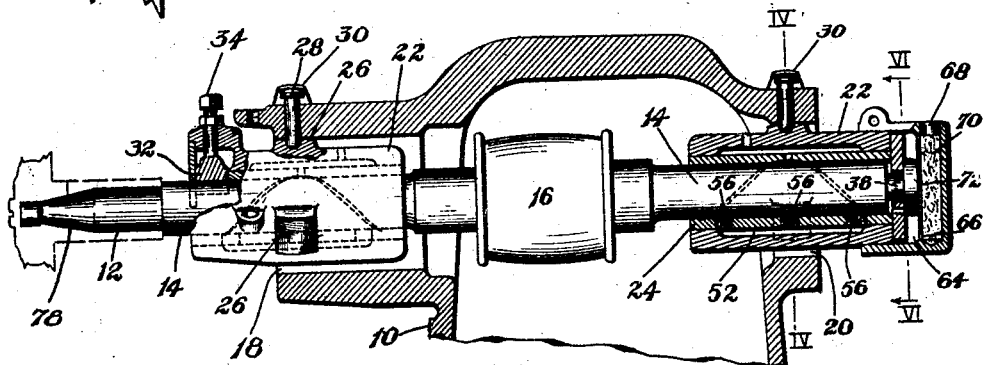
Fig. 1 is a vertical section, partly in elevation, of the upper part of an edge-trimming machine showing the cutter shaft and bearing assemblage.

The front bearing shown at the left of Fig. 1 includes an adjustable pressure-sustaining block 32 which is held against the upper surface of the shaft by an adjusting screw 34. The purpose of this block is to sustain the upward pressure caused by presenting the work to the under side of the cutter. The rear bearing does not require any device of this character but is provided with a double-acting end-thrust bearing about to be described.

To provide for eliminating end-shake, the shaft 12 is provided at its rear end with a head 36 illustrated as of the same diameter as that of the rear journal portion 14, and therefore capable of passing through the bearing 24 in which the rear journal portion 14 is arranged. The head 36 is formed by turning an annular peripheral groove in the shaft near its rear end, such groove leaving a neck 38 connecting the head and the body of the shaft and providing also a surface or shoulder 40 in a plane at right angles to the axis. This surface, by engaging a thrust-sustaining member 42, is adapted to maintain the shaft against end-shake in one direction while end-shake in the opposite direction may be eliminated by a relatively adjustable member arranged to engage another face of the shaft opposite to the face 40. As shown, the end of the shaft, that is, the crown of the head 36, is used for this purpose and the relatively adjustable member by which it is engaged is a cup-shaped dust-proof cap 44 that encloses the member 42 and also encloses one end of the bearing sleeve 22.

Figure 6:
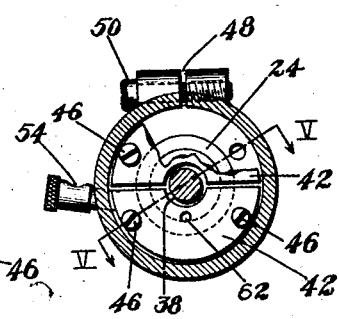
Fig. 6 is a section in the plane indicated by line VI—VI of Fig. 1.

The member 42 as shown, is a two-part collar (see Fig. 6) each part of which is secured individually to the rear end of the bearing member 22 by two screws 46. Since the member 42 is made in two parts, the head 36 may be an integral part of the shaft. The width of the groove, as represented by the length of the neck 38, is preferably slightly greater than the thickness of the member 42 to provide clearance, as shown at the left side of the member 42 in Fig. 1 and above the member 42 as shown in Fig. 5. This clearance, bounded by the thrust member 42, the internal surface of the bushing 24, and the groove in the shaft provides an annular oil-chamber surrounding the neck of the shaft inside the bushing. Whatever oil collects in this chamber from the bearing surfaces of the shaft and the bushing may flow to the surface 40 of the shaft and the contacting surface of the thrust member 42. The cap 44 is split at one point by forming a kerf 48 and is provided with a screw 50 by which it may be contracted sufficiently to clamp the sleeve 22 upon which it is placed. When the crown of the cap bears against the crown of the head 36, and thereby takes up all end-shake, dust is excluded from the thrust bearing.

It is to be noted that since the members 42 and 44 are both secured to the one bearing sleeve 22, they partake of the self-alining movement of the shaft bearing. Furthermore, the opposed end-thrust surfaces of the shaft are so close to each other that the distance between them is not affected by expansion and contraction of the metal. Consequently, the accuracy of adjustment of the member 44 is permanent under all conditions.

The outer sleeve 22 of the rear shaft bearing is further provided with an internal oil-chamber 52 surrounding the inner sleeve or bushing 24. Oil may be supplied to this chamber through an oil cup or filler 54. As shown by Fig. 1, three radial holes are formed in the inner sleeve 24 and are filled with plugs 56 of wood the grain of which extends from the oil-chamber toward the shaft. These plugs are fitted accurately in the holes and restrict the passage of oil to the quantity that seeps through the wood. A figure-eight oil groove 55 is formed in the bearing surface of the bushing, and since this form of oil groove is endless the quantity of oil that may overflow the bearing sleeve is very small even though the oil-chamber 52 be nearly full.

To provide for lubricating the end-thrust bearings when the shaft is substantially horizontal as herein shown, the collar 42 is provided with an oil-hole 62 located in the groove of the shaft. Since the groove is wider than the member 42 it not only provides an annular oil-chamber but also maintains open communication between said chamber and the front end of the oil-hole 62. Thus, provision is made for unobstructed flow of oil from the annular oil-chamber inside the sleeve 24 to the surface 40 of the head 36. Whatever oil overflows from this point collects in the chamber 64 of the cap 44 (see Fig. 1) and flows through a port 66 which communicates with a vertical bore or duct 68. A body of felt or other capillary material 70 is placed in the bore 68 to carry the oil to a higher level where another port 72 is formed to deliver the oil to the contacting surfaces of the cap and the head 36 of the shaft.

An overflow port 74 is formed in the cap 44 above the level of the port 66 and below the levels of the ports 62 and 72. The bore 68 is open at the top to receive oil directly from an oiler so that the surfaces of the thrust-bearing may be lubricated before the overflow from the journal bearing is available.

The described construction permits adjusting the end-thrust bearing before the shaft is mounted in the frame or column 10. For example, the rear journal bearing may first be placed on the rear journal portion 14 of the shaft; then the collar 42 may be attached; the cap 44 may now be applied, adjusted and secured to complete the rear bearing assemblage; the front journal bearing having been secured in its socket 18, the shaft may be mounted by inserting the front end first through the rear socket 20 and finally through the front bearing. Incidentally, the pulley 16 passes through the rear socket 20 and the rear bearing enters this socket. The only remaining steps are to insert the rear locking pin 28 in its socket and to place the retaining spring 30 in operative position.

When the cap 44 is adjusted axially to make the space 64 between its crown and the collar 42 just equal to the axial dimension of the head 36, the cutter shaft 12 is not only maintained against end-shake in both directions but the thrust-sustaining surfaces are assured of lubrication so long as the chamber 52 contains oil.

Fig. 2 shows a typical toothed cutter 76 for trimming the forepart of the sole of a shoe. Such a cutter is commonly affixed to the portion 78 at the front end of the cutter shaft 12. The bed 80 of the cutter operates on the edge of the sole, the lip 82 bevels the margin of the welt, and the back 84 bevels the tread surface of the sole.

Having thus described my invention, what I claim as new and desire to secure by Letters Patent of the United States is:

1. A machine comprising a rotary tool-shaft having two journal portions and a driven member between them, a frame having two coaxial bearing sockets one of which is large enough to permit said driven member to pass through it, bearing sleeves formed to be inserted axially into said sockets respectively to engage said journal portions, said shaft having an annular peripheral groove near one end to provide a thrust abutment, and two relatively adjustable members affixed to one end of one of said bearing sleeves to provide a double-acting end-thrust bearing, one of the latter said members being arranged to engage said end of the shaft and the other being arranged to engage a face of said groove.

2. A machine comprising a supporting frame having coaxial bearing sockets, self-alining bearing sleeves formed to be inserted axially into said sockets respectively, two relatively adjustable members affixed to the outboard end of one of said sleeves to provide a double-acting end-thrust bearing, and a rotary tool-shaft arranged in said bearing sleeves and having an annular peripheral groove near one end to cooperate with one of said members, the other one of said members being arranged to engage said end of the shaft, and means for driving said shaft.

3. A machine comprising a stationary bearing member provided with an internal cylindric bearing surface and means arranged to conduct oil thereto, a rotary shaft journaled in said member and having an annular peripheral groove, a thrust-sustaining member affixed against one end of said bearing member and projecting into said groove, said groove being wider than said thrust-sustaining member, and means arranged to maintain a side surface of said groove against the outer surface of said thrust-sustaining member in such a manner that the opposite side of said groove will form a wall of an annular oil-chamber inside said bearing member, said thrust-sustaining member having a passage-way in said groove through which oil may flow from said chamber to the abutting surfaces of said groove and said thrust-sustaining member.

4. A combination comprising a bearing sleeve, a shaft journaled therein and having an annular peripheral groove near one end whereby a neck and head are formed, a thrust-sustaining member fixed to one end of said sleeve and arranged in said groove to engage the inner end of said head, a member adjustably secured to said sleeve to engage the outer end of said head and to maintain said inner end against said thrust-sustaining member, and a support for said sleeve provided with a socket through which said shaft and the other end of said sleeve may be inserted while they are maintained in assembled relation by said thrust-sustaining member and the other said member.

5. A combination comprising a supporting frame provided with a detachable bearing sleeve, a rotary shaft journaled in said sleeve and having an annular peripheral groove near one end, and a double-acting thrust-bearing the component parts of which are affixed to one end of said sleeve whereby the sleeve, the thrust-bearing and the shaft may remain assembled and cooperatively intact while they are being mounted in and demounted from the frame, said groove and the adjacent end of the shaft being cooperatively related to said thrust-bearing.

6. A combination comprising a substantially horizontal bearing sleeve, a shaft journaled therein and having an annular peripheral groove near one end whereby a neck and head are formed, a thrust-sustaining member fixed to one end of said sleeve and arranged in said grove to engage the inner end of said head, a cap attached to said end of said sleeve to enclose said thrust-sustaining member and to provide a chamber to receive oil from said bearing sleeve, the closed end of said cap being arranged to engage the outer end of said head, and means arranged to transfer the oil in said chamber to the contacting faces of said head and cap.

7. A combination comprising a bearing sleeve, a shaft journaled therein and having a head projecting beyond the sleeve, said head being adapted to pass through said sleeve, and two relatively adjustable means attached individually to one end of said sleeve and engaging said head to provide a double-acting thrust bearing for said shaft, one of said means being a cup-shaped cap enclosing said head and the other said means.

8. A combination comprising a substantially horizontal bearing sleeve, a shaft journaled therein, said shaft having a head projecting beyond the sleeve and adapted to pass therethrough, two means attached individually to one end of said sleeve and engaging said head to provide a double-acting thrust bearing for said shaft, one of said means being a cup-shaped cap enclosing said head and the other said means, and means arranged to supply oil from said bearing sleeve to the effective surfaces of said thrust bearing.

9. An edge-trimming machine comprising a hollow supporting column having coaxial cylindric bearing sockets, front and rear bearing sleeves adapted to be inserted axially into said sockets, means for retaining said sleeves in said sockets, a cutter-shaft having front and rear journal portions adapted to be inserted axially into said sleeves respectively, the front end of said shaft having provision for mounting a trimming cutter, and a double-acting end-thrust bearing secured to the rear end of the rear bearing sleeve, the rear end of said shaft having a head adapted to cooperate with said thrust-bearing, and said shaft having an integral pulley between said journal portions adapted to pass through the socket for said rear bearing sleeve.

In testimony whereof I have signed my name to this specification.

NORWOOD H. KNOWLTON.